United States Patent Office 3,132,173
Patented May 5, 1964

3,132,173
PROCESS FOR THE PRODUCTION OF 4-CYANO-2,2-DIMETHYL BUTYRALDEHYDE
Hanns Gerber, Buderich, near Dusseldorf, and Rudolf Stroh, Leverkusen-Bayerwerk, Germany, assignors to Farbenfabriken Bayer Aktiengesellschaft, Leverkusen, Germany, a corporation of Germany
No Drawing. Filed Mar. 22, 1962, Ser. No. 181,892
Claims priority, application Germany Apr. 7, 1961
3 Claims. (Cl. 260—465.1)

The present invention relates to a new process for the production of 4-cyano-2,2-dimethyl butyraldehyde, in which a cyanoethylation takes place with one of the starting materials being split up.

It is already known that 4-cyano-2,2-dimethyl butyraldehyde (II) can be prepared by reacting isobutyraldehyde with acrylonitrile in the presence of alkaline catalysts. According to one of these processes, catalytic quantities of sodium hydroxide solution are used as alkaline catalyst. However, only 35 to 40% of 4-cyano-2,2-dimethyl butyraldehyde are obtained in this way (see U.S. Patent 2,409,086). According to another process, a 20 to 25% potassium cyanide solution is used as alkaline catalyst and yields of 80 to 85% of 4-cyano-2,2-dimethyl butyraldehyde are obtained (see French Patent 886,846). These prior known processes have major disadvantages. Thus, with the first process the yield is too low for its use on an industrial scale. With the second process, the working up presents considerable difficulties and relatively large quantities of potassium cyanide are required, the elimination of which also presents considerable difficulties when the process is carried out on an industrial scale.

It is an object of the present invention to provide a new process for the production of 4-cyano-2,2-dimethyl butyraldehyde. Another object is to provide a process which can be simply carried out and leads to good yields. Yet another object is to use as starting materials, materials which are readily available. Other objects will be apparent from the following description and the example.

It has now been found that 4-cyano-2,2-dimethyl butyraldehyde (II) can be obtained in a simple manner and with very good yields if 1 mol of isobutyraldol (I) is reacted with at least 2 mols of acrylonitrile at temperatures between 50 and 95° C. in the presence of catalytic quantities of an alkali hydroxide.

It must be considered as extremely surprising that the acrylonitrile reacts with the isobutyraldol with splitting up of this molecule and practically no secondary products are formed.

The course of the reaction can be reproduced by the following reaction diagram:

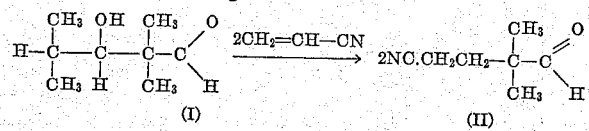

The isobutyraldol used as starting material may be pure or of only commercial purity. It is also possible to employ isobutyraldol which has been prepared immediately before the reaction according to the invention and has not been further purified. Isobutyraldol is also obtainable in a simple manner on a large scale. The acrylonitrile should preferably have the usual degree of purity and may be stabilized against polymerization is desired.

Alkali hydroxides are used as catalyst. It is desirable to use them as an aqueous solution containing about 40 to 70% of alkali hydroxides, advantageously about 50% of alkali hydroxides and not in solid form. Potassium hydroxides and sodium hydroxides are preferred.

The process of the invention is carried out at temperatures between 50 and 95° C., advantageously between 70 and 90° C.

It is preferable to use 2 to 4 mols and advantageously about 3 mols of acrylonitrile to 1 mol of isobutylraldol. The excess acrylonitrile acts as solvent. If too large an excess of acrylonitrile is employed, secondary reactions can occur. The alkali hydroxides are used in quantities of 1/10 to 1/500 of a mol, based on isobutyraldol. However, it is also possible to use quantities below or above the ranges indicated.

In order to carry out the process of the invention, a mixture of isobutyraldol and acrylonitrile is introduced into a reaction vessel and the catalyst is simultaneously added dropwise. The process may be effected in an open vessel or under reflux. It is desirable to stir the reaction mixture. Heating is generally necessary in order to maintain the temperature according to the invention.

The working up of the reaction mixture can be carried out by conventional methods. Preferably, the reaction mixture is neutralized with a weak acid, such as acetic acid, the excess acrylonitrile is then distilled off and the residue is then subjected to vacuum distillation. The 4-cyano-2,2-dimethyl butyraldehyde is then obtained in yields higher than 97%, calculated on the isobutyraldol which is used. The reaction time is generally between 1 and 3 hours.

The process of the invention presents a number of advantages. Simple starting materials are used, extremely simple catalysts only are required, and the process may be carried out under gentle reaction conditions and leads to a very pure end product with high yields.

4-cyano-2,2-dimethyl butyraldehyde is known and can be employed for a large number of synthetic reactions in various fields, for example in the field of synthetic plastics.

Example 1

A mixture of 1 mol of isobutyraldol and 3 mols of acrylonitrile, as well as 1/100 mol of sodium hydroxide as 50% aqueous solution is simultaneously introduced into a stirrer-type vessel. The reaction mixture is kept at a temperature of about 85° C. The mixture is vigorously stirred during the reaction. A reflux condenser prevents the acrylonitrile from evaporating. After a reaction period of 1 to 2 hours, the reaction mixture is cooled, neutralized with acetic acid and subjected to distillation at normal pressure until all excess acrylonitrile has evaporated. The residue is distilled in vacuo at 10 mm. Hg. The 4-cyano-2,2-dimethyl butyraldehyde distils over at 109° C. Yield: 97.5%, calculated on the isobutyraldol which is employed.

Example 2

Repeating the procedure of example 1 but using 1/100 mol of potassium hydroxide in the place of 1/100 mol of sodium hydroxide, 4-cyano-2,2-dimethyl butyraldehyde is obtained in a yield of 98.2%, calculated on the isobutyraldol.

*Example 3*

Repeating the procedure of example 1 but using 1/300 mol of sodium hydroxide as 60% aqueous solution in the place of 1/100 mol of sodium hydroxide as 50% aqueous solution, 4-cyano-2,2-dimethyl butyraldehyde is obtained in a yield of 97.2%, calculated on the isobutyraldol.

We claim:

1. Process for the production of 4-cyano-2,2-dimethyl butyraldehyde, which comprises heating 1 mol of isobutyraldol with 2 to 4 mols of acrylonitrile to a temperature of between 50 and 95° C. in the presence of 1/100 to 1/500 mol based on the isobutyraldol of an alkali metal hydroxide as catalyst and recovering the 4-cyano-2,2-dimethyl butyraldehyde thus formed.

2. Process according to claim 1, wherein the alkali metal hydroxide is employed in the form of an aqueous solution thereof containing from 40 to 70% by weight of said alkali metal hydroxide.

3. Process for the production of 4-cyano-2,2-dimethyl butyraldehyde, which comprises heating 1 mol of isobutyraldol and about 3 mols of acrylonitrile together with 1/100 mol of sodium hydroxide as an about 50% aqueous solution to a temperature between 70 and 90° C. cooling and neutralizing the reaction mixture and subjecting the neutralized reaction mixture to a fractional distillation to thereby recover the 4-cyano-2,2-dimethyl butyraldehyde.

No references cited.